United States Patent
Deseure et al.

(10) Patent No.: US 8,506,866 B2
(45) Date of Patent: Aug. 13, 2013

(54) METHOD FOR PRODUCING A MULTILAYERED PART

(75) Inventors: Jürgen Deseure, Wetteren (BE); Koen De Metsenaere, Wetteren (BE); Gert Raeymackers, Wetteren (BE); Hugo De Winter, Wetteren (BE); Siegfried Moens, Wetteren (BE); Dirk Meert, Wetteren (BE)

(73) Assignee: Recticel Automobilsysteme GmbH, Rheinbreitach (DE)

( * ) Notice: Subject to any disclaimer, the term of this patent is extended or adjusted under 35 U.S.C. 154(b) by 1139 days.

(21) Appl. No.: 12/300,930
(22) PCT Filed: May 15, 2007
(86) PCT No.: PCT/EP2007/054722
§ 371 (c)(1), (2), (4) Date: Mar. 3, 2009
(87) PCT Pub. No.: WO2007/135033
PCT Pub. Date: Nov. 29, 2007

(65) Prior Publication Data
US 2012/0064320 A1   Mar. 15, 2012

(30) Foreign Application Priority Data
May 18, 2006  (EP) ................................. 06114167

(51) Int. Cl.
B29C 45/14 (2006.01)
(52) U.S. Cl.
USPC ......................................... 264/275; 264/250
(58) Field of Classification Search
None
See application file for complete search history.

(56) References Cited

U.S. PATENT DOCUMENTS

| | | | | |
|---|---|---|---|---|
| 5,411,688 A * | 5/1995 | Morrison et al. | | 264/45.4 |
| 5,938,993 A * | 8/1999 | Greene | | 264/46.4 |
| 7,284,784 B2 * | 10/2007 | Cowelchuk et al. | | 296/153 |
| 7,458,631 B2 * | 12/2008 | Cowelchuk et al. | | 296/153 |
| 7,478,854 B2 * | 1/2009 | Cowelchuk et al. | | 296/1.02 |
| 8,197,939 B2 * | 6/2012 | Benoit et al. | | 428/423.3 |
| 2002/0053750 A1 * | 5/2002 | Schwaighofer | | 264/46.4 |
| 2004/0099989 A1 | 5/2004 | Bohne et al. | | |
| 2005/0079336 A1 * | 4/2005 | Dry et al. | | 428/304.4 |

FOREIGN PATENT DOCUMENTS

| | | |
|---|---|---|
| DE | 37 25 436 A1 | 2/1989 |
| EP | 0 807 505 A1 | 11/1997 |

* cited by examiner

*Primary Examiner* — Edmund H. Lee
(74) *Attorney, Agent, or Firm* — Sughrue Mion, PLLC

(57) ABSTRACT

The invention relates to a method for producing a multilayered part which comprises a moulded core (5) and a flexible polyurethane skin layer (4). The core itself comprises a moulded substrate layer (1) which is made of a substrate material, in particular a thermoplastic material, having a Shore A hardness higher than 60. The flexible polyurethane skin (4) is produced by a reaction overmoulding (ROM) process wherein a polyurethane reaction mixture is moulded in a closed mould (11, 12) over at least a first area of the core surface. The moulded core (5) comprises in addition to said substrate layer (1) a softer material which is moulded onto the substrate layer (1) and/or onto which the substrate layer (1) is moulded. This moulded softer material has a Shore A hardness lower than 60 and forms a softer layer (2) between the flexible polyurethane layer (4) and the substrate layer (1) and/or a seal (3) engaging the internal wall of the mould (11, 12) during the ROM process.

22 Claims, 4 Drawing Sheets

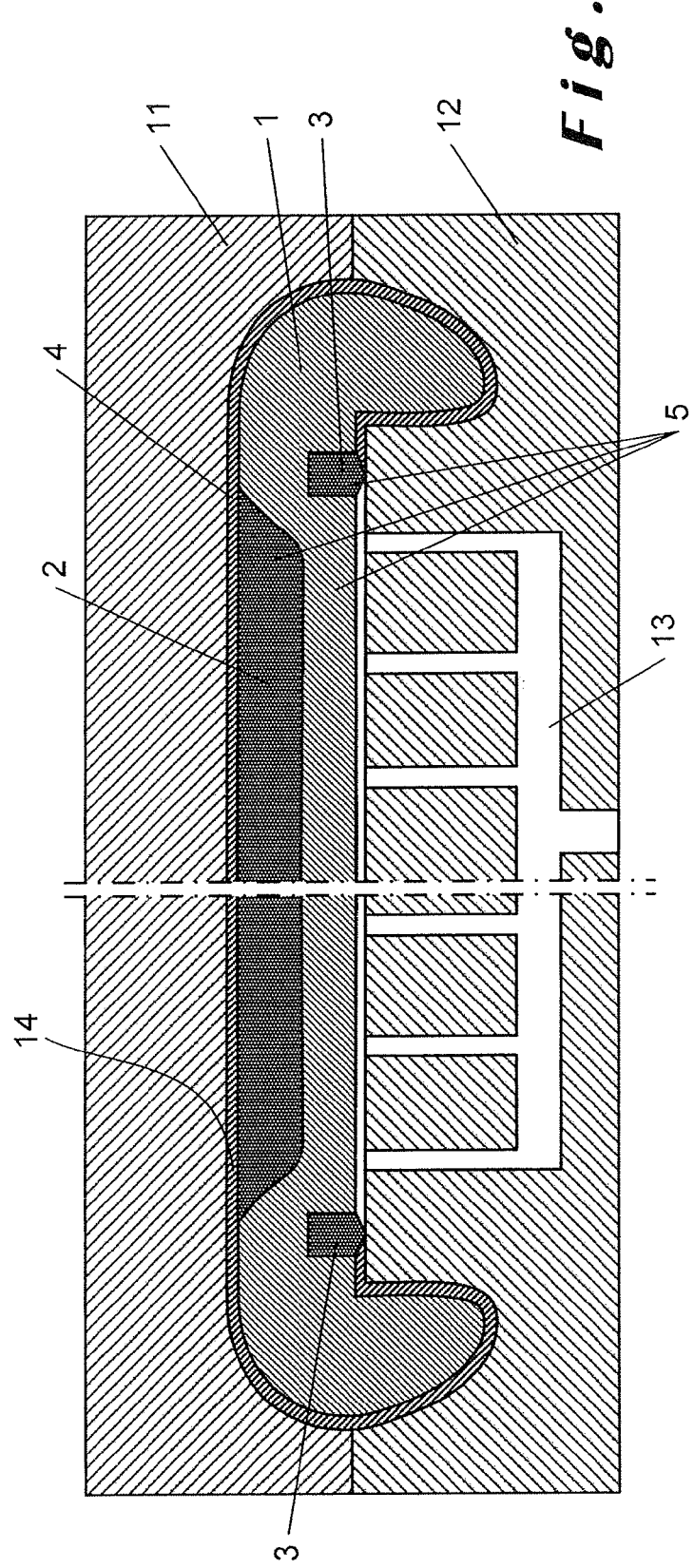

METHOD FOR PRODUCING A MULTILAYERED PART

CROSS REFERENCE TO RELATED APPLICATION

This application is a National Stage of International Application No. PCT/EP2007/054722 filed May 15, 2007, claiming priority based on European Patent Application No. 06114167.7, filed May 18, 2006, the contents of all of which are incorporated herein by reference in their entirety.

The present invention relates to a method for producing a multilayered part which comprises a moulded core and a flexible polyurethane layer formed by a flexible polyurethane skin layer or by a flexible integral skin polyurethane foam layer. The core itself comprises a moulded substrate layer which is made of a substrate material having a Shore A hardness higher than 60. The flexible polyurethane layer has an average density higher than 400 kg/m³ and preferably higher than 500 kg/m³. The method comprises the steps of providing a mould having at least a first and a second mould section which are movable with respect to one another to open and close the mould; providing the moulded core inside the mould so that a gap exists between the surface of the core and the internal wall of the mould when the mould is closed; introducing a polyurethane reaction mixture in said gap between the surface of the core and the internal wall of the mould to overmould at least a first area of the core surface with the polyurethane reaction mixture; allowing the polyurethane reaction mixture to cure in said gap to produce the flexible polyurethane layer therein; and opening the mould and removing the produced multilayered part.

The multilayered part may in particular be an interior trim part for the automotive industry which comprises a flexible skin layer, or a flexible integral skin foam layer, and a rigid substrate layer, moulded in accordance with a three-dimensional shape, as core. The larger interior trim parts are usually produced by positioning a pre-manufactured substrate layer on a first mould section and a pre-manufacture skin layer on a second mould section and by applying a polyurethane backfoam system between the substrate and skin layers. In this way the skin layer is adhered to the substrate layer and a soft feel is provided by the backfoam layer. The polyurethane skin layer can be produced by spraying the polyurethane reaction mixture onto a mould surface as disclosed for example in EP-B-0 379 246. For sealing off the cavity of the backfoam mould, the substrate layer can be pressed against the elastomeric skin layer as disclosed in WO 2005/021230.

For producing smaller trim parts, the above described backfoam system is quite expensive and involves relatively high scrap rates (for example due to visible defects in the produced part for instance by air bubbles produced during the backfoaming process which might become visible after aging). In practice, the flexible polyurethane skin layer is therefore usually moulded for such smaller parts directly over the substrate layer, more particularly according to a so-called ROM (reaction overmoulding) process. In the known ROM processes, the rigid substrate or core is positioned onto the lower mould section, more particularly onto a flexible seal which is provided in a groove in the lower mould section, and after having lowered the upper mould section on top of the lower mould section a polyurethane reaction mixture is injected in the closed mould cavity to cover the surface area of the core delimited by the seal.

U.S. Pat. No. 7,014,208 discloses a process for producing an interior vehicle trim panel, more particularly an airbag covering portion of an instrument panel, wherein a structural core layer is overmoulded with a thermoplastic elastomer or alternatively with a polyurethane skin material. In the airbag covering portion of the instrument panel the core layer is composed of a thermoplastic substrate layer which is moulded against the back of a sheet of a relatively flexible hinge material. The hinge material is preferably formed of a thermoplastic elastomer. To increase the tensile strength of the hinge material, a scrim of nylon or polyester is embedded therein. The instrument panel is rendered soft and smooth to the touch by using a skin material for the outer layer which has, compared to the substrate, a generally soft tactile feel.

A drawback of above described ROM processes is that, although the polyurethane skin material may provide a softer tactile feel than the rigid substrate, it does not provide the desired softness as obtainable by the presence of a flexible or semi-flexible backfoam layer between the substrate layer and the skin layer.

A further drawback is that the flexible seal which is to be provided in the ROM mould poses a number of problems. First of all, since the rigid substrate is positioned on top of the seal, the seal determines the position of the substrate in the mould and therefore the width of the gap between the surface of the substrate and the inner surface of the mould or in other words the thickness of the flexible skin layer. Due to the tolerances of the depth of the seal groove (in practice +/−0.1 mm) and of the total height of the seal (in practice +/−0.4 mm: including the tolerances of the seal body and of the projecting seal lip) the thickness of the skin may vary considerably (in the worst case +/−0.5 mm or a total fluctuation of 1 mm), especially relative to the average thickness of the skin which is for example 1.2 to 1.4 mm. The thinner the skin layer, the more visible surface defects become, such as air bubbles. Furthermore, when the trim part will later be integrated in a car interior (e.g. in an instrument panel), the transition will not be flush because of these skin thickness variations. This leads to scrap. A further problem of the seal is that it is cut manually and positioned manually into the seal groove. Besides the time needed to do this, this manual handling causes an extra fluctuation in sealing efficiency: too long seals will protrude the substrate extra upwards, too short seals will cause contamination of the seal groove with reactive polyurethane material, which of course has to be avoided because of mould cleaning time waste.

To obtain a substantially flash free polyurethane layer moulded by a ROM process over a substrate without having to provide a seal in the mould, U.S. 2004/0108614 discloses to provide the substrate with a projecting, continuous circuitous ridge that forms a seal between the substrate and the upper mould section. A drawback of this known process is that the substrate has to be made of a material that exhibits suitable compressibility and deformability to achieve the required sealing function. The process can thus be used for example for producing acoustic barrier systems for motor vehicles as disclosed in U.S. 2004/0108614, but not for other, more rigid or self-supporting interior trim parts for vehicles.

An object of the present invention is therefore to provide a new method for producing a multilayered part wherein the polyurethane skin layer is produced by a ROM process onto the core comprising the substrate layer, which method enables to achieve a softer feel as obtainable by a backfoam layer and/or which method enables to obviate the above described problems relating to the seal required in the ROM process.

To achieve this object, the method according to the present invention is characterised in that the core which is overmoulded with the polyurethane reaction mixture for producing the flexible polyurethane layer comprises the substrate layer and at least one softer moulded part which is moulded onto the substrate layer or the substrate layer is moulded onto the softer moulded part or the substrate layer and the moulded softer part are moulded against one another, said softer moulded part being made of a softer material with a Shore A hardness lower than 60 and forming a second area of the core surface.

The method according to the invention enables to achieve, in a first embodiment, a softer feel as obtainable by a backfoam layer by providing the moulded softer part, or one of the moulded softer parts, of the core in such a location on the substrate layer that the first area of the core surface, i.e. the area of the core surface which is overmoulded with the polyurethane reaction mixture, overlaps with the second area of the mould surface, i.e. the area formed by the softer material, so that in the area of overlap the softer material forms a softer layer between the substrate layer and the flexible polyurethane layer. In a second embodiment, the method according to the invention also enables to solve the above described seal problems by providing the softer moulded part, or another one of the softer moulded parts, of the core in such a location on the substrate layer that the softer material extends at least partially along an edge of said first area, and by positioning the moulded core, which has been manufactured in advance, in the mould so that the softer material contacts the internal wall of the mould to form a moulded seal for said polyurethane reaction mixture when this polyurethane reaction mixture is moulded over said first area of the core surface.

An important advantage of the method according to the invention is that the production of a moulded core comprising in addition to the harder substrate material also a softer material involves only relatively small additional costs, especially when both the substrate material and the softer material are thermoplastic materials so that the core can be made by a multicomponent molding process (for example by a so-called 2K injection moulding, by a combination of an injection and a low pressure moulding process such as a compression moulding process or by a co-injection moulding process). These additional costs are considerably smaller than the extra costs to mould, in an additional step, a backfoam layer between the substrate layer and the flexible skin layer. Also, the additional costs to provide a soft material with a sealing function on the substrate material are very low compared to the costs related to manually positioning the seals in the mould and to the scrap resulting from this manual process.

The present invention also relates to the multilayered part obtainable by the method according to the invention.

Other particularities and advantages of the invention will become apparent from the following description of some particular embodiments of the method and of the multilayered part according to the present invention. The reference numerals used in this description relate to the annexed drawings wherein:

FIG. 3 illustrates the step of overmoulding the core in a third mould with a polyurethane reaction mixture to produce a flexible polyurethane skin layer according to a reaction overmoulding (ROM) process;

FIG. 4 illustrates schematically the multilayered part obtained by the method illustrated in the previous figures; and.

The invention relates to a method for producing a multilayered part, in particular an interior trim part for an automotive vehicle, and to the part obtainable by that method. The trim part will usually be a relatively small trim part such as an ash can lid or a cup holder, although also larger trim parts can be produced by this method.

Figure 5:
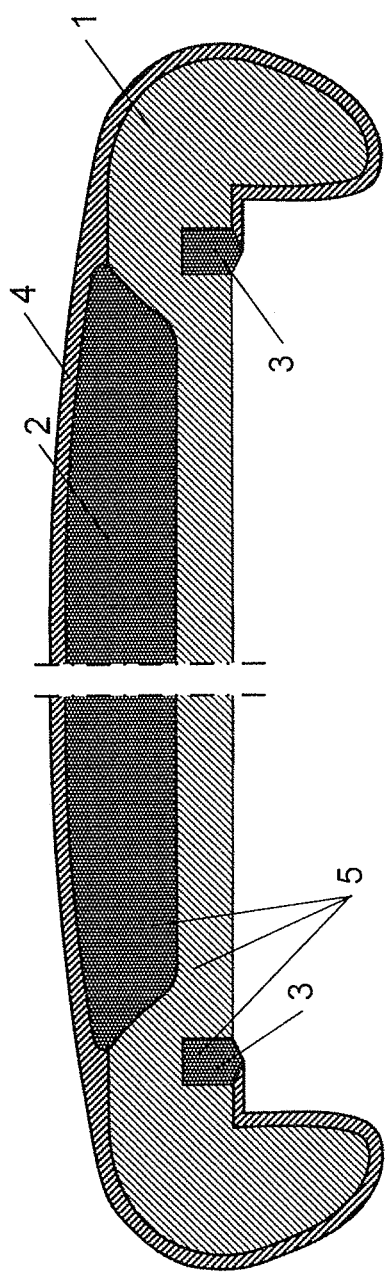
FIG. 5 illustrates schematically another embodiment of the multilayered part.

FIGS. 4 and 5 illustrate schematically a multilayered part which can be produced by the method according to the invention. This part comprises a relatively rigid substrate layer 1, two softer moulded parts, namely a softer layer 2 and a seal 3, and a flexible polyurethane layer 4. In FIG. 4 the softer layer 2 is situated in a recessed portion of the substrate layer 1 so that its top surface is substantially flush with the surface of the substrate layer 1 whilst in FIG. 5 the softer layer 2 protrudes out of the substrate layer.

According to the invention, the substrate layer 1 is made of a substrate material which has a Shore A hardness higher than 60 whilst the softer moulded parts, i.e. the softer layer 2 and the seal 3, are made of a softer material having a Shore A hardness lower than 60. The softer layer 2 and the seal 3 can either be made of the same or of a different material.

The softer layer 2 is moulded onto the substrate layer 1 or the substrate layer 1 is moulded onto the softer layer. Independently of the way wherein the softer layer 2 is moulded, the seal 3 is also moulded onto the substrate layer 1 or the substrate layer is moulded onto the seal. Alternatively, the substrate material and the softer material can be moulded simultaneously, in particular by a co-injection moulding process, so that the substrate layer 1 and the softer moulded part 2, 3 are moulded against one another. The substrate layer 1, the softer layer 2 and the seal 3 thus form a core 5 which is moulded of the softer material (or materials if the seal is made of a different material than the softer layer) and of the substrate material. The flexible polyurethane layer 4 covers a first area of the core surface. The seal 3 extends along an edge of this first area whilst the softer layer 2 forms a second area of the core surface which overlaps with the first area so that in the area of overlap, the softer layer 2 is situated between the substrate layer 1 and the flexible polyurethane layer 4 to provide for an additional soft feel.

The substrate layer 1 is relatively rigid and has in particular a flexural modulus, measured according to ASTM D790, higher than 500 MPa, preferably higher than 700 MPa. Although the substrate layer can be made of a thermosetting material, for example of a polyurethane material which is preferably reinforced with glass fibres or with a glass fibre mat, the substrate is preferably made of a thermoplastic material which may also be reinforced, in particular with glass fibres. This thermoplastic material is preferably selected from the group consisting of PC (polycarbonate), ABS (acrylonitrile butadiene styrene) and ABS blends, in particular PC/ABS, SMA (styrene maleic anhydride), PPO (polyphenylene oxide), TPO (thermoplastic olefin), in particular PP (polypropylene), polyacetals, in particular POMs (polyoxymethylenes), nylon, polyester, acrylic and polysulfone. The flexible polyurethane layer 4 is relatively flexible and has in particular a flexural modulus, measured according to ASTM D790, lower than 100 MPa, preferably lower than 75 MPa, more preferably lower than 55 MPa and most preferably lower than 40 MPa. Suitable reaction mixtures for producing the flexible polyurethane layer are disclosed for example in EP-B-0 929 586 and in WO 04/000905, which are included herein by reference. In the area wherein the softer layer 2 is situated between the flexible polyurethane layer 4 and the substrate layer 1, the flexible polyurethane layer 4 is preferably a flexible polyurethane skin layer (which usually has an average density higher than 600 $kg/m^3$) having an average thickness smaller than 2.2 mm, preferably smaller than 1.9 mm and more preferably smaller than 1.6 mm. In this way, the softness of the softer layer 2 can be felt optimally when touching the outside of the multilayered part. The skin layer will usually have a thickness larger than 0.4 mm, preferably larger than 0.7 mm and more preferably larger than 1.0 mm. The flexible polyurethane layer may also be a flexible integral skin polyurethane foam layer. Such a layer is thicker than the polyurethane skin layer and may provide some further softness to the trim part. This is especially advantageous in areas wherein the multilayered part does not comprise a softer layer 2 or when the multilayered part does not contain a softer layer 2 at all. Both in the case of a skin layer and in the case of an integral skin foam layer, the flexible polyurethane layer has an average overall density higher than 400 kg/m$^3$, and preferably higher than 500 kg/m$^3$ to provide the required mechanical properties (tensile strength, tear resistance, . . . ).

In view of achieving a softer feel such as the softer feel obtainable by a conventional backfoam layer, the material of the softer layer 2 situated between the outer polyurethane layer 4 and the substrate layer 1 has preferably a Shore A hardness lower than 30, more preferably lower than 20 and most preferably lower than 10. Moreover, the softer layer 2 has preferably an average thickness greater than 2 mm, more preferably greater than 3 mm. In order to avoid processing problems when moulding the softer layer 2, it has preferably an average thickness smaller than 10 mm, and more preferably smaller than 7 mm.

The Shore A hardness is determined in accordance with DIN 53505. If the softer layer 2 has a thickness smaller than 6 mm, two or more layers should be stacked onto one another when doing the hardness measurement since the DIN standard specifies a minimum sample thickness of 6 mm. The average thickness of the softer layer 2 can easily be calculated by dividing its surface area, i.e. the area of the core formed by the softer layer, by its volume.

In view of its sealing function during the production of the multilayered part, which will be described more into detail hereinafter, the softer material of the seal 3 has preferably a Shore A hardness which is lower than 50, more preferably lower than 40, and higher than 10. The seal 3 has further preferably an average height (measured in the direction wherein the seal 3 is urged in the production process against the mould surface) of at least 1 mm, more preferably of at least 2 mm and more preferably of at least 3 mm. Moreover, the seal 3 is preferably at least partially recessed in a groove 6 in the moulded substrate layer 1 so that it protrudes over a smaller distance out of the substrate layer 1 in the produced part and so that it receives some lateral support from the substrate material when the seal is pressed against the mould surface.

The material of the seal 3 and the material of the softer layer 2 have preferably an average density higher than 300 kg/m$^3$, preferably higher than 400 kg/m$^3$ and more preferably higher than 500 kg/m$^3$. Such a high density is advantageous during the production process more particularly for the seal to achieve an effective sealing and for the softer layer to provide an adequate support during the moulding of the flexible polyurethane layer on top of the softer layer. The softer material is preferably a non-cellular or micro-cellular material but may also be a cellular material obtained by the use of a physical or chemical blowing agent. When the density of the cellular material is above the above-mentioned lower limits, most of the cells will be closed cells so that also an effective sealing or support can be achieved.

The softer material used for the seal 3 or for the softer layer 2 may be a thermosetting polyurethane material but is preferably a thermoplastic elastomer. This thermoplastic elastomer may be selected from the group consisting of thermoplastic urethanes (TPUs), styrene copolymers, thermoplastic olefins (TPOs), thermoplastic silicones and elastomeric alloys. The softer material preferably comprises at least one thermoplastic styrene block copolymer, in particular styrene-ethylene-butylene-styrene block copolymer (SEBS) and/or styrene-butylene-styrene block copolymer (SBS).

Figure 1:
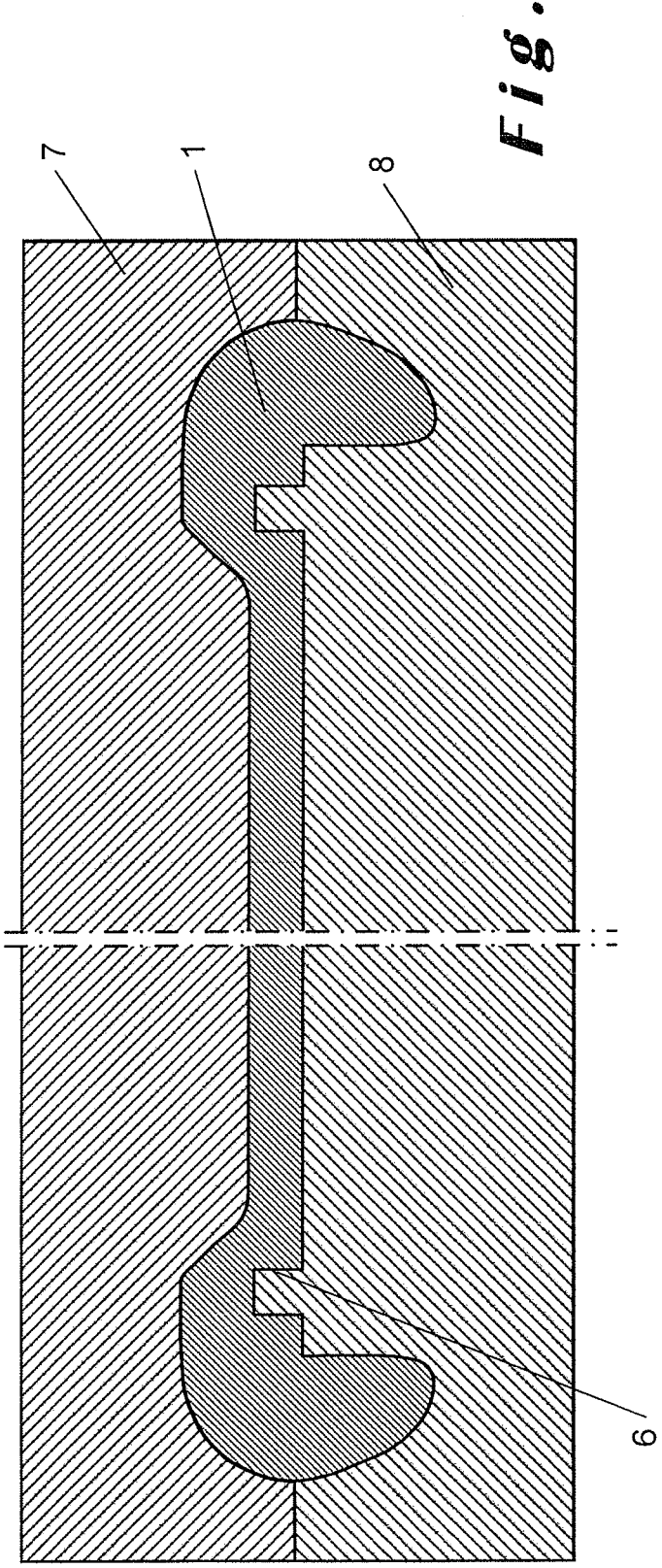
FIG. 1 illustrates schematically the step of moulding a substrate layer in a first closed mould.
Figure 2:
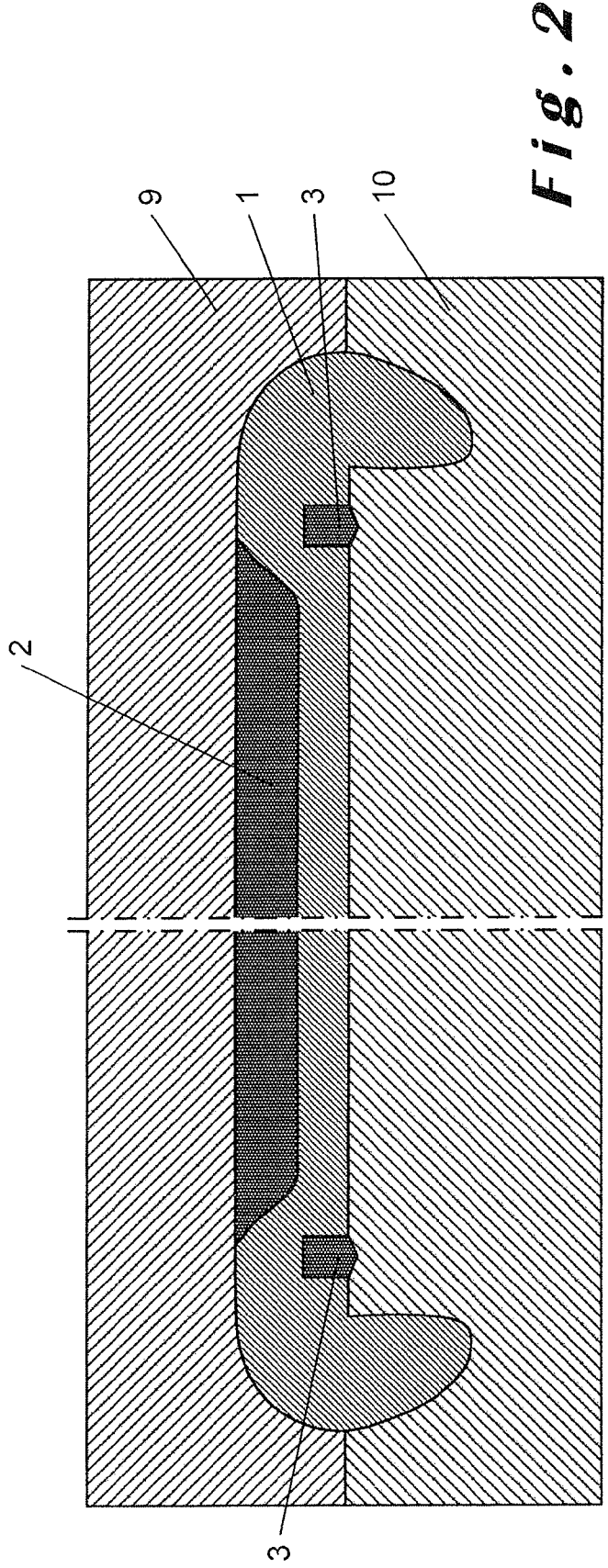
FIG. 2 illustrates the step of overmoulding the substrate layer in a second closed mould with a softer material to obtain a moulded core.

FIGS. 1 to 3 illustrate a method which can be used to produce the multilayered part shown in FIG. 4.

In a first step, illustrated in FIG. 1, the substrate layer 1 is made in a first closed mould comprising an upper 7 and a lower mould section 8. When the substrate is made of a thermosetting material, more particularly of a rigid polyurethane material, it can be produced in the mould 7, 8 in accordance with an S-RIM (Structural RIM, insertion of glass fibre mat), an R-RIM (Reinforced RIM, glass or other fibres admixed into the polyurethane reaction mixture), an LFI (Long Fibre Injection) or a similar process. In the method according to the invention, the substrate layer 1 is however preferably made of a thermoplastic material. The substrate layer 1 is preferably made by an injection moulding process in the mould 7, 8 but may also be produced therein in accordance with an injection pressure moulding process or in accordance with a low pressure moulding process (e.g. a compression moulding process). In all of these processes, the substrate material is moulded under pressure in a closed mould 7, 8 so that the substrate layer 1 has quite accurate dimensions.

In the second step, the moulded substrate layer 1 is transferred to a second mould which comprises an upper 9 and a lower mould section 10. The mould cavity of this second mould is somewhat larger than the mould cavity of the first mould to provide additional space for moulding the softer layer 2 and the seal 3. When the softer material comprises a thermosetting polyurethane material, the softer layer 2 and the seal 3 can be produced in accordance with a ROM process in the second mould 9, 10, more particularly by injecting a polyurethane reaction mixture in the mould cavity. The softer material is however preferably a thermoplastic material which is preferably moulded in accordance with an injection moulding process. It can also be moulded in accordance with an injection pressure moulding or a low pressure moulding process. In all of these processes, the softer material is moulded under pressure in a closed mould 9, 10 so that the softer layer 2 and the seal 3 also have quite accurate dimensions.

Instead of using a second mould, i.e. a two steps process, it is also possible to use a one step process wherein the substrate materials stays on the same mould section when moulding the softer material. This can be done by providing one or more slides in the first mould or by providing a further upper or lower mould section and replacing the upper 7 or the lower mould section 8 by this further mould section to mould the softer layer 2 or the seal 3. For some designs, it may also be possible to inject the softer material and the substrate material simultaneously in the first mould, in accordance with a co-injection moulding process. Moreover, it is also possible to use two different materials for the softer layer 2 and for the seal 3. These two materials can be moulded successively, either in the same mould (by withdrawing slides or by providing an additional mould section) or in an additional mould. An advantage of using a thermoplastic material for the substrate layer 1 and a further thermoplastic material for the softer layer 2 and/or for the seal 3 is that the additional costs for providing the softer layer 2 and/or the seal 3 can be kept quite low.

In a third step, the moulded core formed by the substrate layer 1 overmoulded with the softer material 2, 3 is transferred to a third mould comprising an upper 11 and a lower mould section 12. The core 1, 2, 3 is positioned onto the lower mould section 12 so that the core rests with its seal 3 onto the mould surface. The lower mould section 12 is provided with vacuum channels 13 so that a vacuum can be created in the portion of the mould cavity delimited by the seal 3. In this way, the core 1, 2, 3 is drawn towards the mould surface and the seal 3 is somewhat compressed against this mould surface. Due to the fact that the seal 3 has been moulded in a closed mould, its dimensions are quite accurate so that the core is accurately positioned into the third mould 11, 12.

After having positioned the core 1, 2, 3 in the third mould 11, 12, the mould is closed. In this closed position, a gap 14 remains between the surface of the core and the internal wall of the mould 11, 12. To produce the flexible polyurethane layer 4, a polyurethane reaction mixture is introduced in this gap 14 to overmould at least a first area of the core surface according to a ROM process (reaction overmoulding process). The polyurethane reaction mixture is more particularly injected in the closed mould according to a Reaction Injection Moulding (RIM) process After having allowed the reaction mixture to cure to produce the flexible polyurethane layer, the multilayered part can be demoulded.

For a skilled person it will be clear that some modification can be applied to the above described method. Instead of first moulding the substrate layer 1 in the first mould 7, 8, it is also possible to mould first the softer layer 2 and/or the seal 3. The substrate material can then be moulded over the softer layer 2 and/or over the seal 3. The softer layer 2 and/or the substrate layer 1 do not necessarily have to be moulded in a closed mould as described hereabove but they could possibly be moulded onto the other layer without using a closed mould. After having produced the substrate layer 1, the material for the softer layer 2 could for example be poured or sprayed in the required thickness onto the substrate layer 1, especially when using a polyurethane reaction mixture for producing the softer layer 2. When a thermoplastic material is used, this material can be moulded for example by a powder slush moulding technique.

Instead of positioning a pre-manufactured core 1, 2, 3 in the mould 11, 12, it is also possible to position only the substrate layer 1 (preferably provided with the seal 3 when the lower mould section 11 does not comprise a seal) onto the lower mould section 12, to mould the softer layer 2 over the substrate layer 1, by means of an additional upper mould section which has the same mould surface as the upper mould section 9 illustrated in FIG. 2, and to overmould subsequently the thus produced core with the polyurethane reaction mixture for the polyurethane layer after having replaced the additional upper mould section by the upper mould section 11 illustrated in FIG. 3.

The materials of the substrate layer 1, of the softer layer 2 and of the flexible polyurethane layer 4 can also be moulded in a one step process. In such a one step process, the substrate layer 1 is maintained onto one of the mould sections against which it is produced, and the softer layer and the flexible polyurethane layer are moulded successively onto the substrate layer after having withdrawn one or more slides or after having provided another mould section.

In an alternative embodiment the substrate layer 1 is not provided with a seal 3 but the seal is provided on the lower mould section 12. In a further alternative embodiment the substrate layer 1 is not provided with the softer layer 2 but only with the seal 3. In this embodiment, a softer feel can be obtained by using a polyurethane reaction mixture which comprises a chemical (water) or a physical blowing agent to produce the flexible polyurethane layer 4. The process conditions, i.e. the mould temperature is controlled in such a manner that a denser skin is formed against the mould surface so that the polyurethane layer 4 is an integral skin foam layer. Such an integral skin foam technique is disclosed for example in EP-A-0 927 738.

In order to improve the adhesion between between the moulded core and the flexible polyurethane layer, the surface of the moulded core can be pretreated before it is overmoulded with the polyurethane material. This can be done by example by treating the surface with a primer, or by polarising the surface e.g. by a corona treatment, or by a plasma gas treatment. These techniques, which are well-known to the skilled in the art, are for instance referred to in WO2006/042818 or in DE10025734.

EXAMPLE 1

A PC/ABS substrate layer was moulded by injection moulding in the form of a plate of 20×20 cm. One side of this plate was overmoulded with a layer of SEBS having a thickness of 6 mm. The SEBS had a density of about 1000 kg/m$^3$ and a Shore A hardness of 0. The layer of SEBS was subsequently overmoulded with a polyurethane reaction mixture to produce a polyurethane skin layer having an average thickness of 1.2 mm and a density of about 900 kg/m$^3$.

To measure the additional soft feel obtained by the SEBS layer, the ILD (Indentation Load Deflection) value of the multilayered part was measured, this means the force needed to impress the material 2 mm with a press stamp of 14 mm at a speed of 5 mm/min. The same ILD value was measured of a conventional multilayered part composed of a PC/ABS substrate layer, a conventional semi-flexible polyurethane backfoam layer (having a thickness of 15 mm) and a same polyurethane skin layer having also an average thickness of 1.2 mm. The ILD value for the multilayered ROM part obtained by the method according to the invention comprised 24 N whilst the ILD value of the conventional backfoamed part comprised 22 N. This shows that a same soft feel can be achieved by a less complex and cheaper ROM process and this even with a softer layer which is thinner than a conventional backfoam layer.

The invention claimed is:

1. A method for producing a multilayered part comprising a moulded core (5) and a flexible polyurethane layer (4) formed by a flexible polyurethane skin layer or by a flexible integral skin polyurethane foam layer, the moulded core (5) comprising a moulded substrate layer (1) made of a substrate material having a Shore A hardness higher than 60 and the flexible polyurethane layer (4) having an average density higher than 400 kg/m$^3$, which method comprises the steps of:

providing a mould (11, 12) having at least a first and a second mould section which are movable with respect to one another to open and close the mould;

providing said core (5) inside said mould (11, 12) so that a gap (14) exists between the surface of the core (5) and the internal wall of the mould when the mould is closed;

introducing a polyurethane reaction mixture in said gap (14) between the surface of the core (5) and the internal wall of the mould (11, 12) to overmould at least a first area of the core surface with the polyurethane reaction mixture;

allowing said polyurethane reaction mixture to cure in said gap (14) to produce the flexible polyurethane layer (4) therein; and opening the mould (11, 12) and removing the produced multilayered part, characterised in that the moulded core (5) which is provided in said mould (11, 12) comprises said substrate layer (1) and at least one softer moulded part (2, 3), which is moulded onto the substrate layer (1) or said substrate layer (1) is moulded onto the softer moulded part (2, 3) or the substrate layer (1) and the softer moulded part (2, 3) are moulded against one another, said softer moulded part (2, 3) being made of a softer material with a Shore A hardness lower than 60 and forming a second area of the core surface.

2. A method according to claim 1, wherein said first area of the core surface overlaps with said second area thereof so that in the area of overlap said softer moulded part forms a softer layer (2) between the substrate layer (1) and the flexible polyurethane layer (4).

3. A method according to claim 2, wherein the flexible polyurethane layer (4) is a flexible polyurethane skin layer having in said area of overlap an average thickness smaller than 2.2 mm.

4. A method according to claim 2, wherein said softer layer (2) has in said area of overlap an average thickness of less than 10 mm.

5. A method according to claim 2, wherein the material of said softer layer (2) has a Shore A hardness lower than 30.

6. A method according to claim 1, wherein the step of providing the core (5) inside said mould (11, 12) comprises the step of positioning a pre-manufactured moulded core (5) in the mould.

7. A method according to claim 1, wherein the step of providing the core (5) inside said mould (11, 12) comprises the step of positioning a pre-manufactured substrate layer (1) in the mould and the step of moulding the softer moulded part (2, 3) in said mould onto the substrate layer (1).

8. A method according to claim 1, wherein said softer moulded part (3) extends at least partially along an edge of said first area, the core (5) being provided inside said mould by positioning a pre-manufactured moulded core (5), comprising said substrate layer (1) and said softer moulded part (3), in the mould so that said softer moulded part (3) contacts the internal wall of the mould (11, 12) to form a moulded seal (3) for said polyurethane reaction mixture when this polyurethane reaction mixture is moulded over said first area of the core surface.

9. A method according to claim 8, wherein said moulded seal (3) is at least partially recessed in a groove (6) in the moulded substrate layer (1).

10. A method according to claim 8, wherein said seal (3) has an average height of at least 1 mm.

11. A method according to claim 8, wherein the material of said seal (3) has a Shore A hardness higher than 10.

12. A method according to claim 8, wherein the material of said seal (3) has a Shore A hardness lower than 50.

13. A method according to claim 1, wherein said softer material has an average density higher than 300 kg/m$^3$.

14. A method according to claim 1, wherein said softer material is a thermosetting polyurethane material.

15. A method according to claim 1, wherein said softer material comprises a thermoplastic elastomer.

16. A method according to claim 15, wherein said softer material comprises at least one thermoplastic styrene block copolymer.

17. A method according to claim 1, wherein said substrate layer (1) is made of a thermoplastic material.

18. A method according to claim 1, characterised in that it comprises the further step of moulding said substrate material (1) and said softer moulded part (2, 3) to produce the moulded core (5).

19. A method according to claim 18, wherein said substrate material is moulded under pressure in a closed mould (7, 8) to produce the substrate layer (1).

20. A method according to claim 18, wherein said softer moulded part (2, 3) is moulded under pressure in a closed mould (9, 10).

21. A method according to claim 18, wherein either said softer moulded part is moulded onto the substrate layer or the substrate layer is moulded onto the softer moulded part.

22. A method according to claim 1, wherein said flexible polyurethane layer (4) is made by a reaction injection overmoulding (ROM) process wherein said polyurethane reaction mixture is injected in said gap (14) between the surface of the core (5) and the internal wall of said mould (11, 12).

* * * * *